United States Patent [19]

Abe et al.

[11] Patent Number: 4,534,595

[45] Date of Patent: Aug. 13, 1985

[54] VEHICLE SEAT

[75] Inventors: Tadafumi Abe; Isao Takahashi, both of Tokyo, Japan

[73] Assignee: Tachikawa Spring Co., Ltd., Tokyo, Japan

[21] Appl. No.: 453,939

[22] Filed: Dec. 28, 1982

[30] Foreign Application Priority Data

| Dec. 29, 1981 | [JP] | Japan | 56-214674 |
| Dec. 29, 1981 | [JP] | Japan | 56-196505[U] |
| Dec. 29, 1981 | [JP] | Japan | 56-196839[U] |
| Apr. 30, 1982 | [JP] | Japan | 57-73565 |

[51] Int. Cl.³ .............................................. A47C 7/02
[52] U.S. Cl. ........................................ 297/452; 5/471; 297/456; 297/DIG. 1; 428/139
[58] Field of Search ......... 297/452, 455, 456, DIG. 1; 5/471, 472; 428/139, 138, 198, 317.1, 317.7

[56] References Cited

U.S. PATENT DOCUMENTS

| 2,326,441 | 8/1943 | Cunningham | 5/471 X |
| 2,631,306 | 3/1953 | Hentiell | 5/472 |
| 2,988,760 | 6/1961 | Sarbach | 5/471 |
| 3,216,167 | 11/1965 | Roberts et al. | 428/139 X |
| 3,283,345 | 11/1966 | Berck | 5/471 |
| 3,647,607 | 3/1972 | Hillers | 428/139 |
| 4,040,881 | 8/1977 | Wallace | 5/472 X |
| 4,117,181 | 9/1978 | Minami et al. | 428/138 |
| 4,247,586 | 1/1981 | Rochlin | 428/138 |
| 4,378,396 | 3/1983 | Urai et al. | 428/198 |
| 4,400,422 | 8/1983 | Smith | 428/198 X |

FOREIGN PATENT DOCUMENTS 2715028 10/1977 Fed. Rep. of Germany ... 297/DIG. 1

*Primary Examiner*—James T. McCall
*Attorney, Agent, or Firm*—Sandler & Greenblum

[57] ABSTRACT

A vehicle seat is provided which has a pad member having a depression on its upper surface, adhesive material disposed in the depression in the pad member and a top member adhered to the pad member at the depression by the adhesive material, whereby a depression is formed in the top member and a number of decorative creases are formed along the periphery of the adhered portion of the top member. Alternatively, the top member can have a depression on its upper surface, adhesive material can be disposed on the under surface of the top member below the depression, and a pad member can be adhered to the top member at the depression by the adhesive material whereby a number of decorative creases are formed along the periphery of the adhered portion of the top member. The top member can be either a single sheet of material or an assembly formed of a sheet of material, foamed wadding, and a wadding cover. The upper surface of the top member can be provided with integral or independent buttons, with the parts of the top member immediately below the buttons adhered to depressions formed on the pad member, to form a seat with decorative buttons on its surface. The portions of the assembly forming the top member are preferably formed of an adhesible hot-melt material. The portions forming the top member assembly can be welded to form a button, the portion of the top member below the buttons being adhered to recesses in the pad member. Access holes can be provided in the recesses of the pad members so that adhesive material can be injected from the bottom side of the seat via an injector tool in order to provide adhesive material for adhering the top member to the recesses of the pad member.

19 Claims, 45 Drawing Figures

PRIOR ART FIG.I(A)
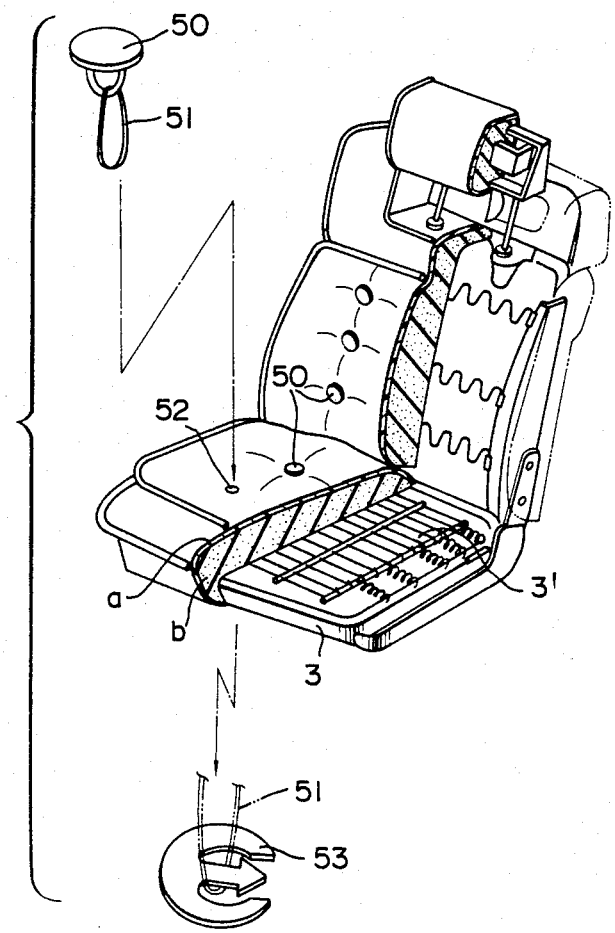
FIG.I(C)
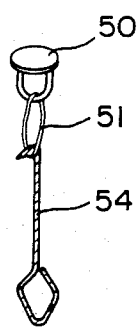
PRIOR ART
FIG.I(B)
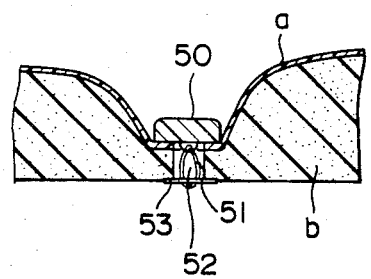
PRIOR ART PRIOR ART FIG. 2(A)
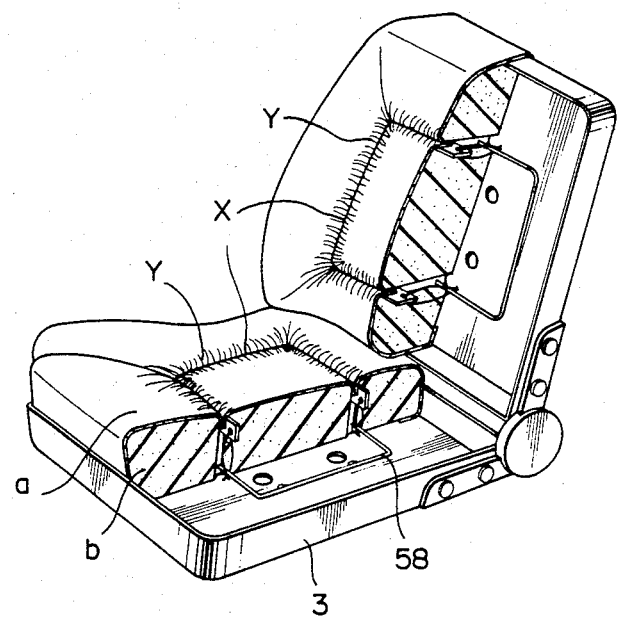
PRIOR ART FIG. 2(B)
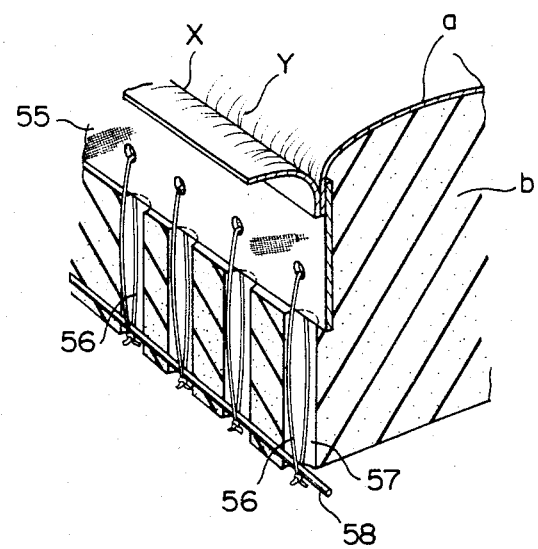

VEHICLE SEAT

TECHNICAL FIELD OF THE INVENTION

The present invention relates to vehicle seats, and more particularly, to automobile seats having a top portion with decorative buttons, grooves, or creases for enhancing the aesthetic appearance of the seat.

BACKGROUND

In conventional vehicle seats, decorative buttons, grooves and creases on the surface of the seat are formed by a pulling-in process using a pull-in tool. As shown in FIG. 1a, according to such conventional seats, a decorative button 50 is provided with a ring string 51 on its underside. Ring string 51 penetrates pull 52 through top layer member a and pad material b. Ring string 51 is pulled downwardly by a tool 54 from the bottom side of the seat in order to secure button 50 to the seat. Because individual buttons 50 must be pulled down by means of a special tool 54, a large number of steps are required in assembling the seat, involving cumbersome work and resulting in inefficient productivity.

Further, as shown in FIG. 2, in conventional vehicle seats, decorative grooves X or creases Y are provided by attaching pulling cloth 55 to the undersurface of top layer member a, inserting cloth 55 into grooves cut in pad material b, attaching strings 56 at predetermined intervals to cloth 55, placing strings 56 into penetration holes 57 in pad material b and finally, pulling down string 56 and securing it to securing member, e.g., a wire, imbedded in the bottom of pad material B.

Is is seen that because cloth 55 must be pulled down in order to pull in top layer member a, e.g., in the case where a decorative button is provided, cumbersome work is required in order to secure the top layer member to pad material b. Moreover, because cut grooves and penetration holes are needed, the cushioning function of the pad material is frequently impaired.

Accordingly, in view of the above-described disadvantages present in conventional vehicle seats, it is an object of the present invention to provide a new and improved vehicle seat with decorative buttons, grooves or creases, without the necessity of using pull-in members.

Upon further study of the specification and appended claims, further objects, features and advantages of the present invention will become more fully apparent to those skilled in the art to which the invention pertains.

BRIEF SUMMARY OF THE INVENTION

Briefly, the above and other objects, features and advantages of the present invention are attained in one aspect thereof by providing a vehicle seat which has a pad member with a depression on its upper surface, adhesive material disposed in the depression, and a top member adhered to the pad member at the depression by the adhesive material, whereby a decorative depression (e.g., a groove) is formed in the top member and a number of decorative creases are formed along the periphery of the adhered portion of the top member.

The above and other objects, features and advantages of the present invention are attained in another aspect thereof by providing a vehicle seat which has a top member with a depression on its upper surface, adhesive material disposed on the under surface of the top member below the depression, and a pad member adhered to the top member at the depression by the adhesive material, whereby a number of decorative creases are formed along the periphery of the adhered portion of said top member.

The depression in either the pad member or the top member can be a groove, and in the case where the pad member has a groove on its upper surface, a groove is formed in the top member when it is adhered to the pad member at the groove thereon by the adhesive material. The groove can be formed in any desired shape, e.g., in a substantially rectangular shape. The pad member is preferably encased in the top member. The adhesive material is preferably an adhesible hot melt material. A frame can also be provided for supporting the pad member. A button can also be provided which is adhered to the groove in the top member. The button can be integral with the top member, or alternatively, can be separate therefrom. A contrasting color tape can be adhered to the groove formed in the top member. The top member can be a single sheet of material, or alternatively, can have a top layer, a layer of foamed wadding beneath the top layer and a wadding cover under the layer of foamed wadding. Each of the top layer, the layer of foamed wadding and the wadding cover is preferably made of a material capable of high frequency welding.

The top member can be provided with a plurality of rows of depressions adapted for adhering to a single depression in the padding member. Contrasting colored tape can be disposed between the end rows of the plurality of rows of depression on the top member.

The pad member can have a second depression and the top member can include a button located such that the button will fit within the second depression in the pad member when the top member is adhered to the pad member. A string can be attached to the button on one end and to a wire imbedded in the pad member on its other end such that the button is pulled into the second depression by the string. Alternatively, the button can be adhered to the bottom of the second depression by an adhesive material, such as an adhesible hot melt material.

The depression in the pad member can include a projection such that when the top member is adhered thereto, a button is formed.

Access holes can be provided in the depression in the pad material. These access holes extend through the bottom of the pad material such that adhesive material can be injected through the access holes into the depression.

BRIEF DESCRIPTION OF THE DRAWINGS

The above and other objects, features and advantages of the present invention will be more fully apparent to those of ordinary skill in the art to which this invention pertains from the following detailed description when considered in connection with the accompanying drawings, in which like reference characters designate like or corresponding parts throughout the several views and wherein:

FIG. 1a is a partially cut-away perspective view of a conventional vehicle seat with decorative buttons;

FIG. 1b is a side sectional view of the seat shown in FIG. 1a;

FIG. 1c illustrates the conventional method of securing top member a to pad member b;

FIG. 2a is a partially cut-away perspective view of a conventional seat provided with decorative grooves and creases;

FIG. 2b is a side sectional view of the seat shown in FIG. 2a;

DETAILED DESCRIPTION OF THE INVENTION

FIGS. 3-15 illustrate embodiments of a vehicle seat A having decorative recess grooves X. More specifically, FIGS. 3-7b illustrate a first embodiment in which a top member a formed of a single sheet of material is utilized.

Figure 5:
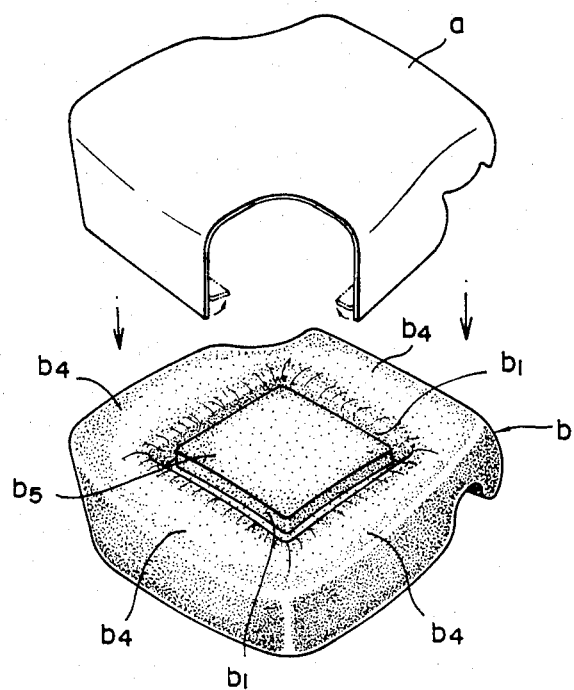
FIG. 5 is an analytical view, partially in section, of the seat shown in FIG. 3.

Top member a can be formed of any typical material used for vehicle seats, e.g., natural or synthetic fiber fabric. Pad member b, which is encased in top member a, has a groove b1, approximately 5 mm-30 mm wide and 10 mm-30 mm deep, along the border between upheaved portion b4 and flat middle portion b5. Groove b1 is preferably molded simultaneously with the forming of pad member b, as illustrated in FIG. 5.

Figure 3:
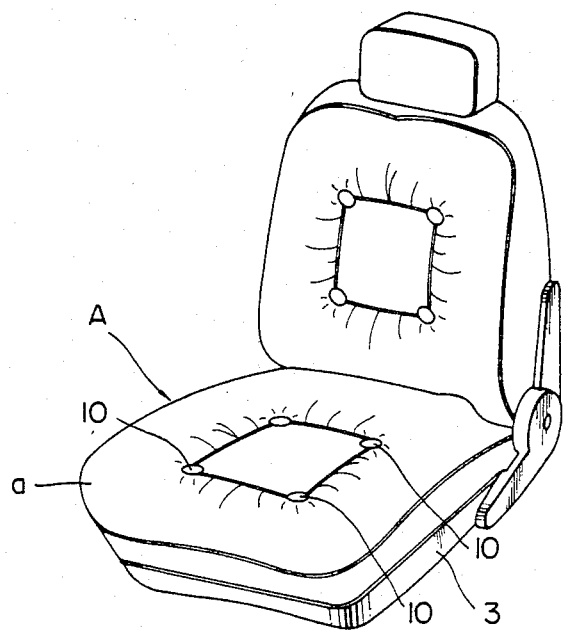
FIG. 3 is a perspective view of a vehicle seat with a decorative groove.
Figure 4:
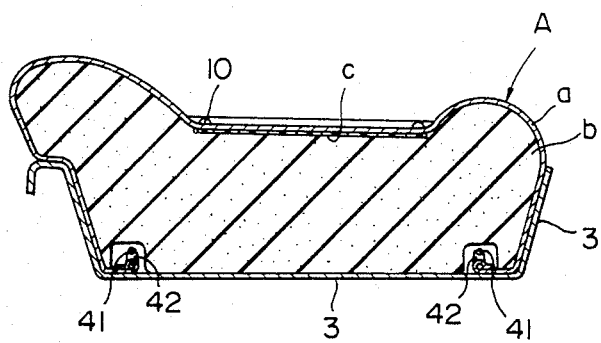
FIG. 4 is a sectional view of the seat shown in FIG. 3.
Figure 6:
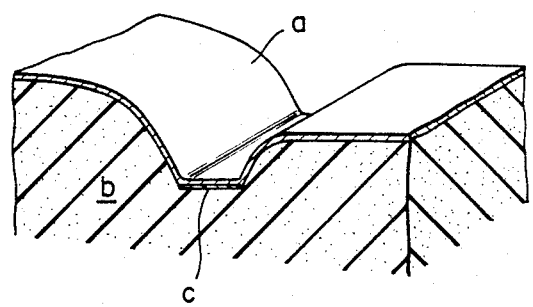
FIG. 6 is a sectional view of part of the vehicle seat shown in FIG. 3.

Top member a is adhered to groove b1 of pad member b by adhesive c which preferably is formed of instantly adhesible hot melt material, as illustrated in FIG. 6. After top member a has been adhered to bottom member b, the ends of top member a are secured to a wire 41, or the like, which is imbedded in the bottom of pad member b, with the use of ring 42, to form a seat a, as illustrated in FIG. 3. Seat a, thus formed, is secured to frame 3, which is shaped like a saucer, by any effective means, e.g., by adhering. Throughout the drawings, reference numeral 10 designates a button provided at the crossing part of top member a, i.e., a button 10 which is disposed at the part of top member a which crossed grove b1 in pad member b. In addition, throughout the drawings, reference numeral 3 denotes a frame to which pad member B is adhered, while reference number 3' designates a spring secured to frame 3.

Figure 7A:
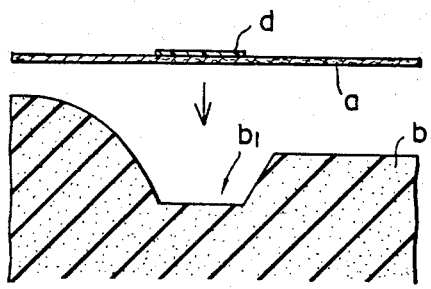
FIGS. 7a and b illustrate a process for adhering a top member to a pad member where the top member is formed of a single sheet of material.
Figure 7B:
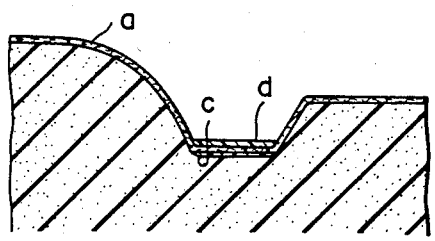

FIGS. 7a and 7b illustrate an embodiment in which the upper surface of top member a, which is adhered to groove b1 is provided with tape having a color which is different from that of top member a, in order to increase the aesthetic appearance of seat a. Because top member a is pressed into groove b1 of pad member b, top member a is tensioned without being loosened, i.e., top member a fits firmly against pad member b at all points of their interface after top member a has been pulled into groove b1.

FIGS. 8-15 illustrate a second embodiment of top member a where top member a has a top layer 4, foamed wadding 5 and wadding cover 6. Layers 4, 5 and 6 are preferably made of material which can be high-frequency welded, such as synthetic resin.

Figure 8A:
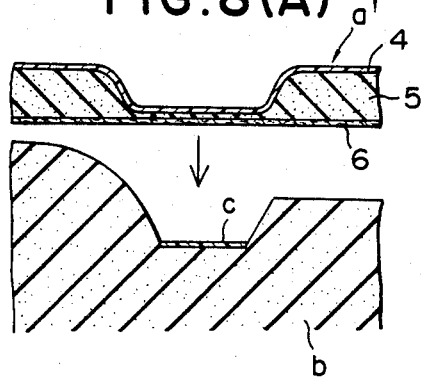
FIGS. 8a and b illustrate a process for adhering a top member to a pad member where both the top member and the pad member have depressions and the top member is formed of a top layer, a wadding material, and a wadding cover.
Figure 8B:
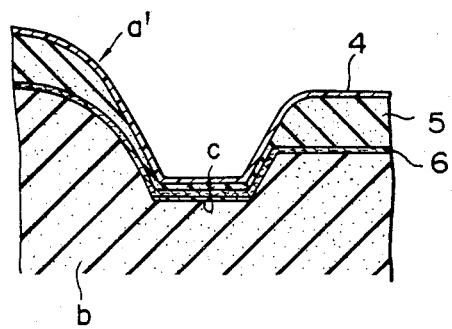

FIG. 8 illustrates an embodiment in which top member a', which is to be adhered to groove b1 is provided with groove a1 through high frequency welding, and in which the portion of top member a' immediately below groove a1 is adhered to groove b1 by adhesive c.

Figure 9A:
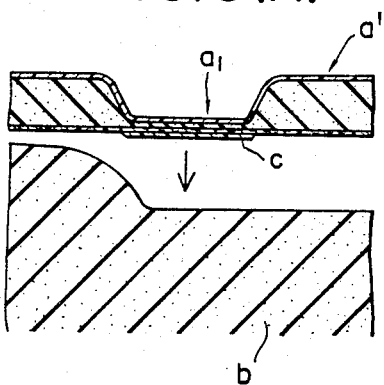
FIGS. 9a and b illustrate a process for adhering a top member to a pad member where the top member only has a depression and the top member is formed of a top layer, wadding material and a wadding cover.
Figure 9B:
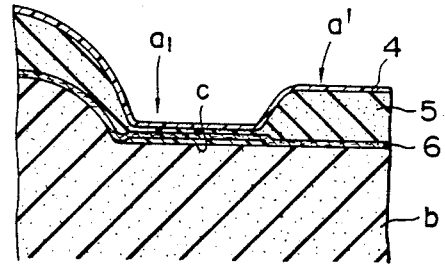
Figure 10:
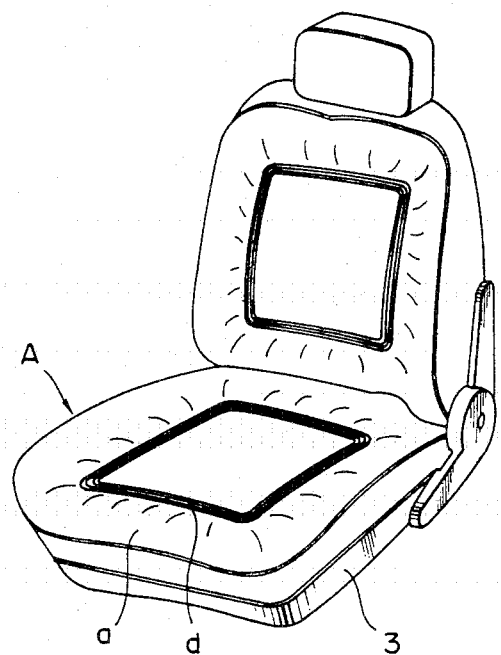
FIG. 10 is a perspective view of a vehicle seat having tape with a different color from the color of the seat.
Figure 11:
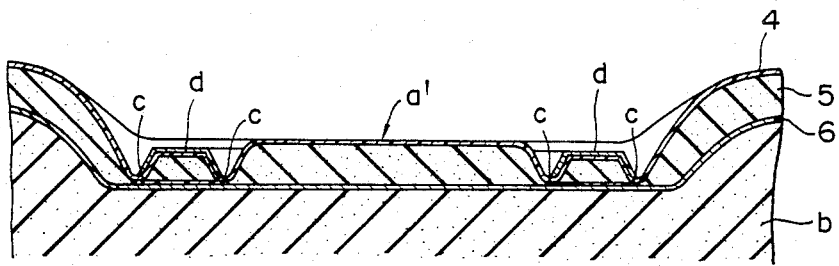
FIG. 11 is a sectional view of the seat shown in FIG. 10.
Figure 12:
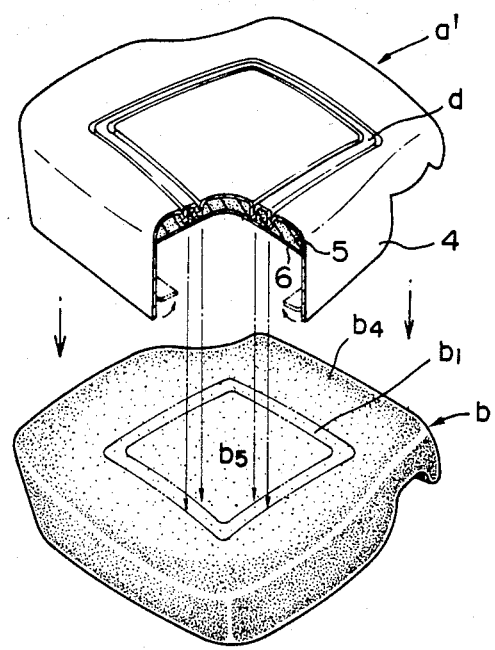
FIG. 12 is an analytical view of the seat shown in FIG. 10.

FIGS. 9a and b illustrate an embodiment in which top member a', having adhesive on its undersurface, is adhered to pad member b, which has no groove b1.

Figure 13A:
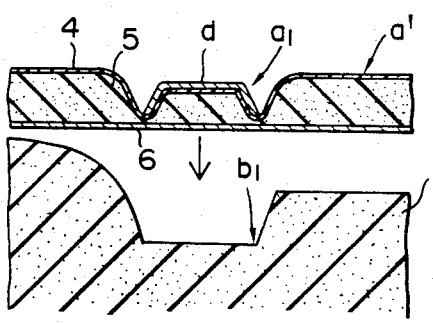
FIGS. 13a and b are sectional views illustrating a process of adhering a top member to a pad member.
Figure 13B:
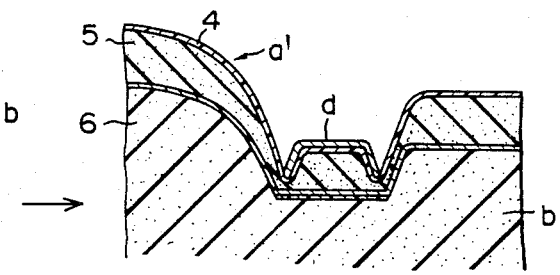

Two or more rows of grooves a1 may be provided in top member a', such that, e.g., as shown in FIG. 13, a pair of parallel grooves in top member a' fit into a single groove b' in pad member b. Tape d, having a color different from that of top member a', may be high-frequency welded between grooves a1 at the time grooves a1 are formed, to provide a seat a' with an improved aesthetic appearance, as shown in FIGS. 10-13.

Figure 14:
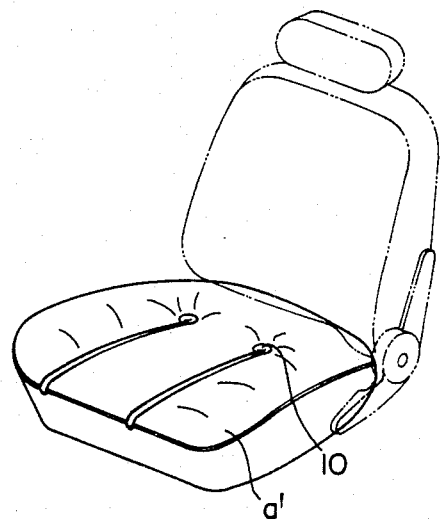
FIG. 14 is a perspective view of a vehicle seat provided with both decorative grooves and buttons.
Figure 15:
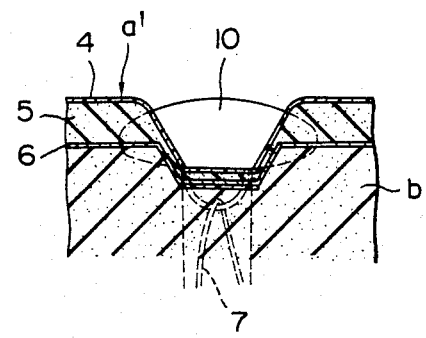
FIg. 15 is a sectional view of the vehicle seat shown in FIG. 14.

FIGS. 14 and 15 illustrate an embodiment in which top member a' is adhered to groove b1 of pad member b just as in the previously described embodiments. In the embodiment of FIGS. 14 and 15, however, buttons 10, which may be formed integrally or separately with top member a', are pulled in by string 7, which can be attached to button 10 by any conventional means. String 7 is secured to a securing member, such as a wire imbedded in the bottom of pad member b. In this embodiment, top member a' is adhered to button 10, and, in addition, is secured to pad member b by virtue of string 7 which pulls button 10 downwardly; thus, top member a' is tensioned without being loosened. I.e., top member a fits firmly against pad member b at all points of their interface after top member a has been pulled into groove b1. Furthermore, because string 7 is pulled in, top member a' will not be pealed off from its adherence to pad member b'.

Accordingly, the seat of the embodiment shown in FIGS. 14 and 15 is simpler in structure than conventional vehicle seats and therefore can be produced more cheaply. This is because it is not necessary to attach a pulling cloth to the top member, nor to provide a cut groove or securing members for the pulling cloth in the bottom of the pad member and, further, because the pulling-in process can be carried out more easily with less steps. Furthermore, because the top member is adhered firmly to the pad member, a complex shape can be formed in relief on the seat suface. In addition, because no cut grooves in the pad member are needed, the cushioning function of the pad member will not be impaired.

Figure 16:
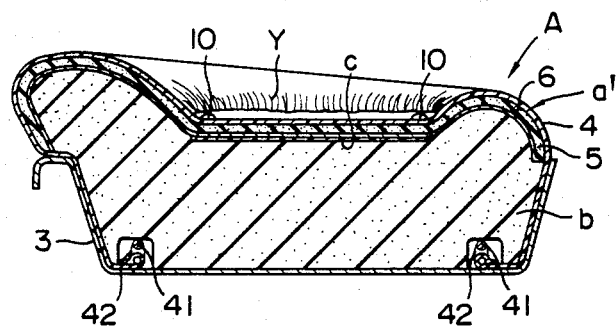
FIG. 16 is a sectional view of a vehicle seat having a decorative crease on the seat surface.
Figure 17A:
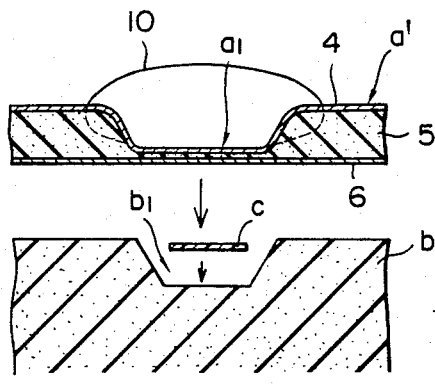
FIGS. 17a and b are sectional views illustrating a process for adhering a top member to a pad member in the vehicle seat shown in FIG. 16.
Figure 17B:
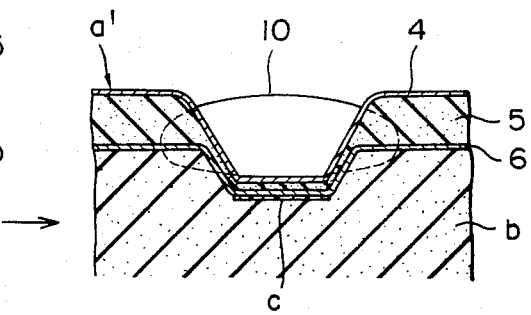

FIGS. 16-19 illustrate embodiments of seat A having decorating creases Y on its surface. FIGS. 16 and 17 illustrate an embodiment of top member a' which is formed of top layer member 4, pad material 5 and pad cover 6, and which has crease Y on its top layer member 4. Pad member b has, as in the embodiments described above, a groove b1 and also a recess b2. Recess b2 has a diameter which is slightly larger than the outer diameter of button 10 at the part of groove b1 where button 10 in recess b2 crosses groove b1.

Top member a', having top layer 4, wadding 5 and wadding cover 6, are high-frequency welded at part a1, i.e., the part of top member a' which is to be directly secured to groove b1 and/or recess b2. Next, adhesive c, e.g., a hot melt material, is applied to groove b1 and recess b2 in pad member b. The bottom of part a1 of top member a' is pushed into groove b1 and recess b2. As a result of securing top member a' to pad member b, a number of decorative creases Y are formed along the periphery of the adhered portion a1 of top member a'.

Figure 18:
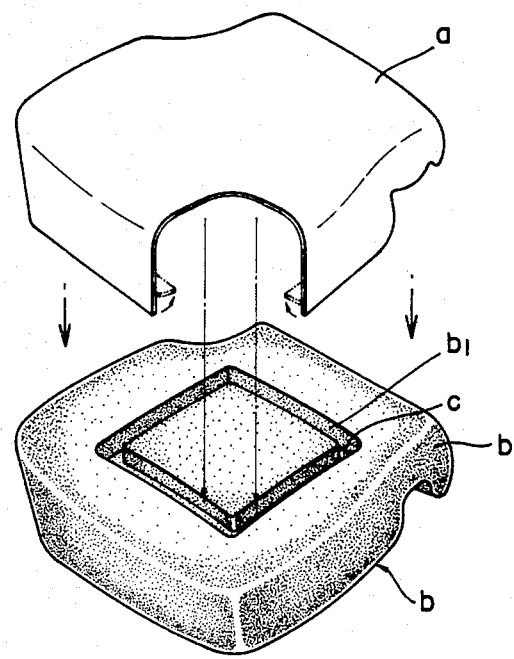
FIG. 18 is an analytical view, partially in section, of the vehicle seat shown in FIG. 16.
Figure 19:
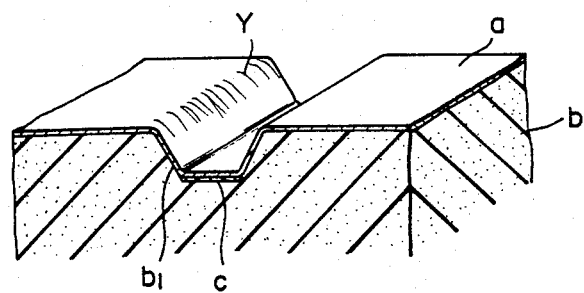
FIG. 19 is a sectional view of the vehicle seat shown in FIG. 16.

FIGS. 18 and 19 illustrate a process for producing a number of creases Y on a top member a, which is formed of a single sheet of material. This process also includes a step of adhering top member a to groove b1 of pad member b.

According to this embodiment, decorative creases Y are formed on the seat surface of top member A merely by adhering top member a to groove b1 of pad member b. Therefore, this process is far simpler than the conventional pulling-in process.

Further, according to the conventional process, decorative creases Y are not formed uniformly because of the difficulty associated with pulling-in all of the pulling members uniformly to a pre-determined depth. According to the process of the present invention, however, these drawbacks are overcome merely by the provision of a uniformly-flattened groove.

In addition, according to the process of the present invention, decorative creases Y can be formed even at those parts of the vehicle seat to which securing members for securing the pulling-in members cannot be provided because of physical difficulties such as limitations on how close a large groove 4 containing the pull-in cloth can be formed to the edge of the pad member.

FIGS. 20-27 illustrate embodiments of a vehicle seat in which decorative buttons 10 are provided on top member a, a'.

Figure 20:
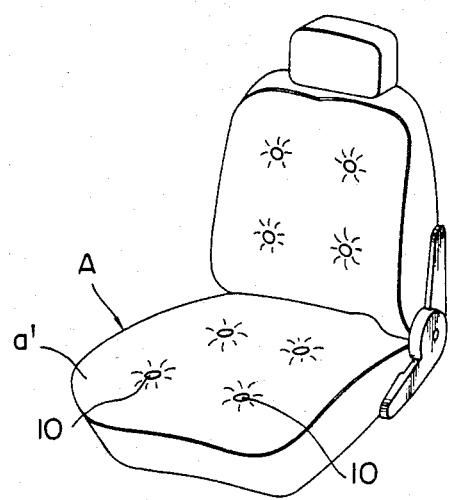
FIG. 20 illustrates a vehicle seat having decorative buttons.
Figure 21:
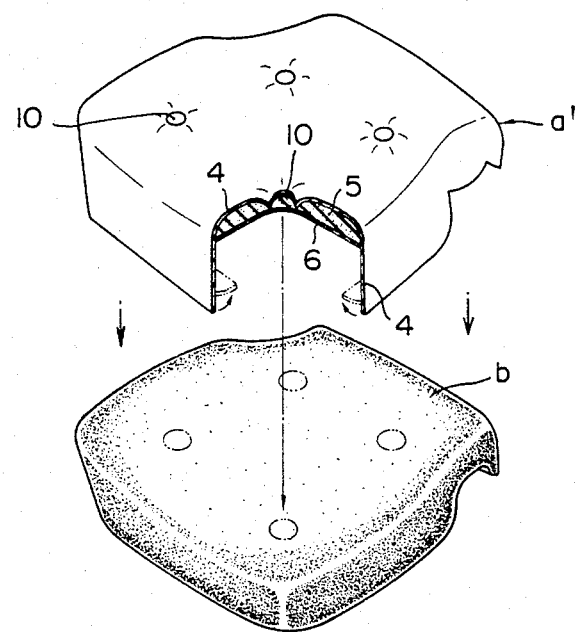
FIG. 21 is an analytical view, partially in section, of the vehicle seat shown in FIG. 20.
Figure 22:
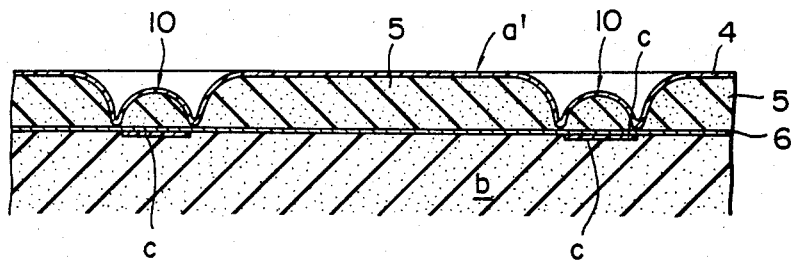
FIG. 22 is a sectional view of a part of the vehicle seat shown in FIG. 20.

FIGS. 20-22 illustrate a first such embodiment in which buttons 10, which are formly integrally with top member a' are adhered to foamed pad material 5, and are produced by the molding process.

Button 10 is shaped by using upper and lower molds. Button 10 is formed on top member a', which includes top layer 4, foamed wadding 5, and wadding cover 6. Layers 4, 5 and 6 are preferably each made of materials which may be high-frequency welded. Layers 4, 5 and 6 are high-frequency welded together simultaneously with molding of button 10. Wadding cover 6 is used for reinforcing wadding 5, and, therefore, cover 6 may be eliminated, if desired.

After top member a' having buttons 10 formed thereon, as shown in FIG. 20, is adhered to pad member b, the ends of top member a' are secured to a securing member which is imbedded in the bottom of pad member b according to conventional processes.

Figure 23:
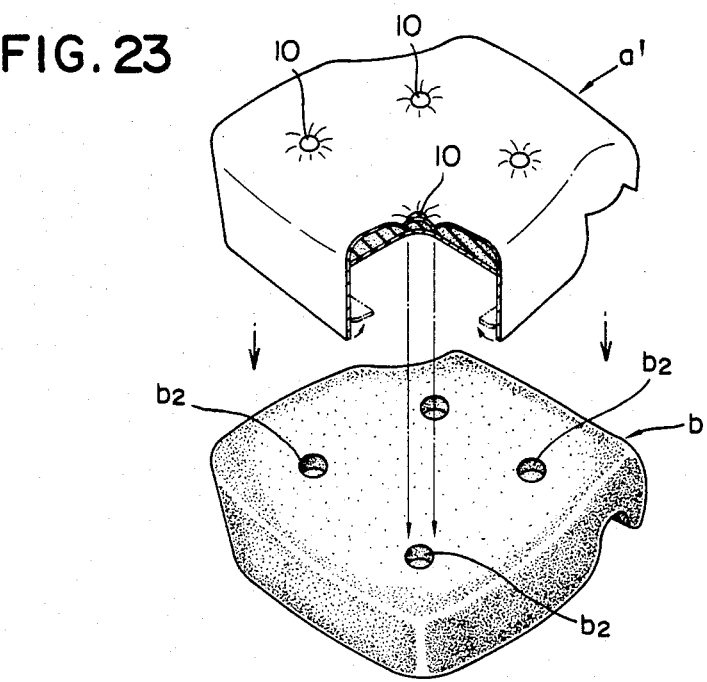
FIG. 23 is an analytical view of a vehicle seat in which the portion of the vehicle seat which is immediately below a button provided in a recess in the top member is adhered to the pad material.
Figure 24A:
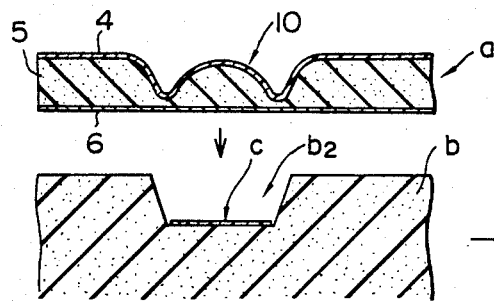
FIGS. 24a and b illustrate a process for adhering a top member, to a pad member in the vehicle seat shown in FIG. 23.
Figure 24B:
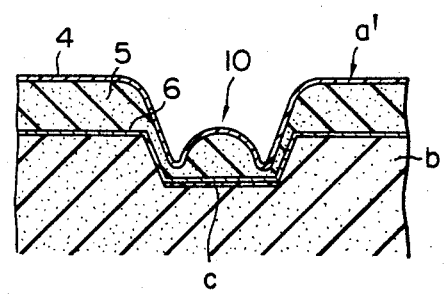

FIGS. 23 and 24 a-b show a second such embodiment in which button 10, which is formed integrally with top member a, is adhered by adhesive c to recess b2 in pad member b. Button 10 does not project above the top level of seat a, and therefore will not be pealed off with use. Further, decorative creases Y are produced in top member a around button 10 as a result of top member a being pulled down into recess b2.

Figure 25A:
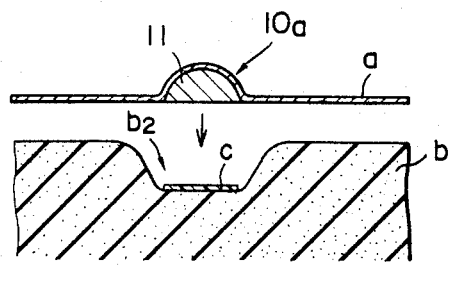
FIGS. 25a and b illustrate a process for adhering a top member, which has a button formed by encasing a semi-circular core within the top member, to a pad member.
Figure 25B:
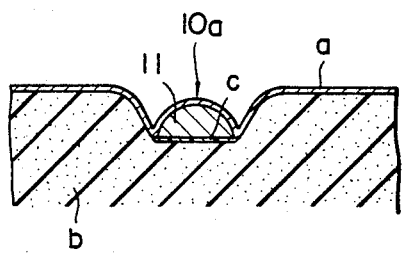
Figure 26A:
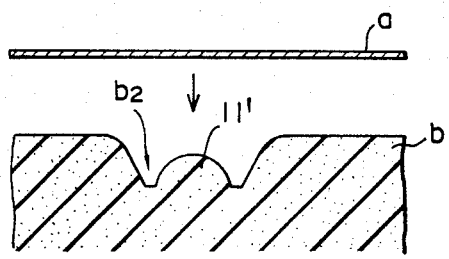
FIGS. 26a and b illustrate a process for adhering a top member to a pad member which has a projection formed in a groove in its top surface.
Figure 26B:
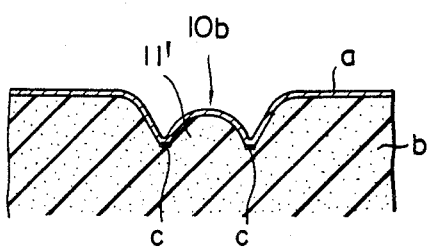
Figure 27:
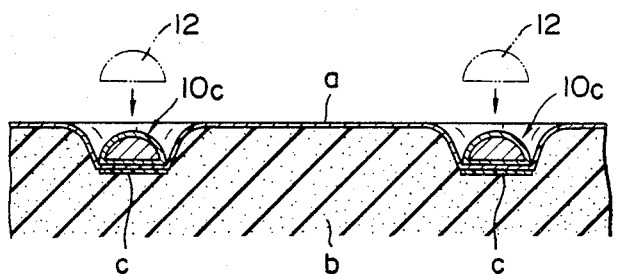
FIG. 27 illustrates yet another process for adhering a top member to a pad member.
Figure 28:
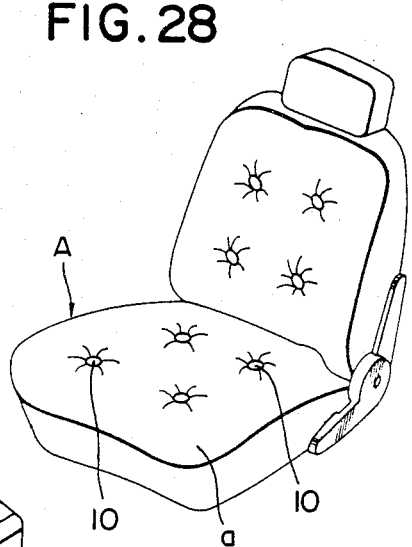
FIG. 28 is a perspective view of a vehicle seat in which a top member is adhered to a pad member by an adhesive material injected by an adhesive injector through access holes and in which the portion of the top member immediately below the button is adhered to the pad member.
Figure 29:
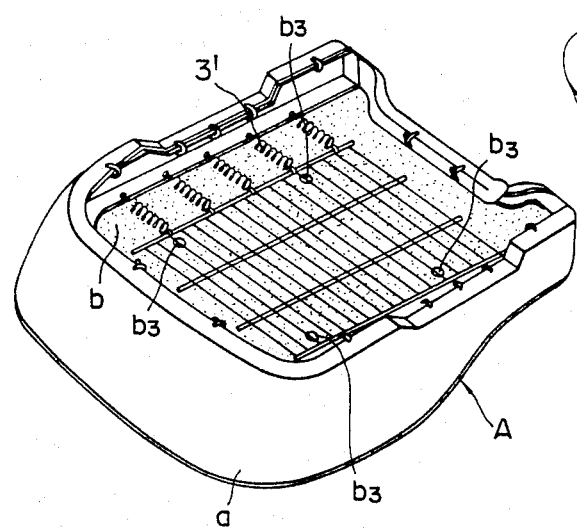
FIG. 29 is a bottom view of the vehicle seat shown in FIG. 28.

FIGS. 25-27 illustrate a third such embodiment in which top member a is formed of a single sheet of material and is adhered to recess b2 in pad member b so as to form buttons 10a, 10b and 10c. Button 10a is formed by encasing a hemispherical core 11 within top member a, and the bottom surface of core 11 is adhered to recess b2, as is clearly shown in FIGS. 25a-b.

FIGS. 26a-b illustrate another process for forming a button 10b by which a semi-circular projection 11' is provided in recess b2 of pad member b, and top member a is adhered to pad member b after adhesive c is applied to the circumference, or to the whole surface of core 11'. The embodiment shown in FIG. 7 includes button 10c which is formed separately or integrally with top member a and which is adhered to top member a, which in turn has been adhered to pad member b. In other words, as shown in FIG. 27, buttons 10c are adhered to top member a, which itself has been adhered to the recess in pad member b.

According to the immediately preceding embodiments, because no pulling-in member is needed to pull-in the decorative buttons, efficiency of assembly is improved in that pulling-in steps are eliminated. Furthermore, because access holes for inserting pulling-in members are unnecessary, the cushioning function of pad member b will not be impaired. Moreover, the button position will not be inclined, thus overcoming a problem which often occurs in conventional vehicle seats.

FIGS. 28-36 illustrate embodiments in which access holes b3 are provided in grooves b1 and/or recesses b2 of pad member b, so that adhesive material may be injected from the bottom side of the access hole by an adhesive injector 13. The adhesive material serves to adhere top member a to pad member b.

More specifically, FIGS. 28-33 illustrate the prefered process for injecting adhesive material into the portion of pad member b immediately below button 10 through access holes b3, so that top member a' may be adhered to pad member b.

Figure 30:
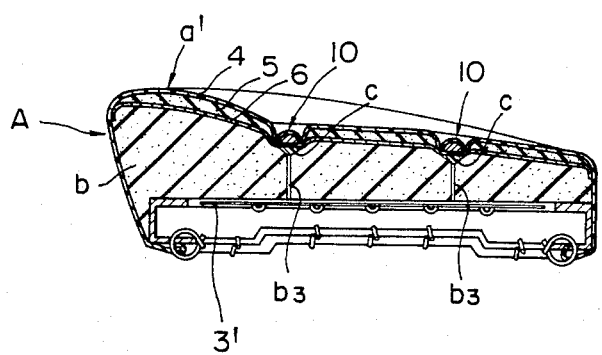
FIG. 30 is a sectional view of the vehicle seat shown in FIG. 29.
Figure 31:
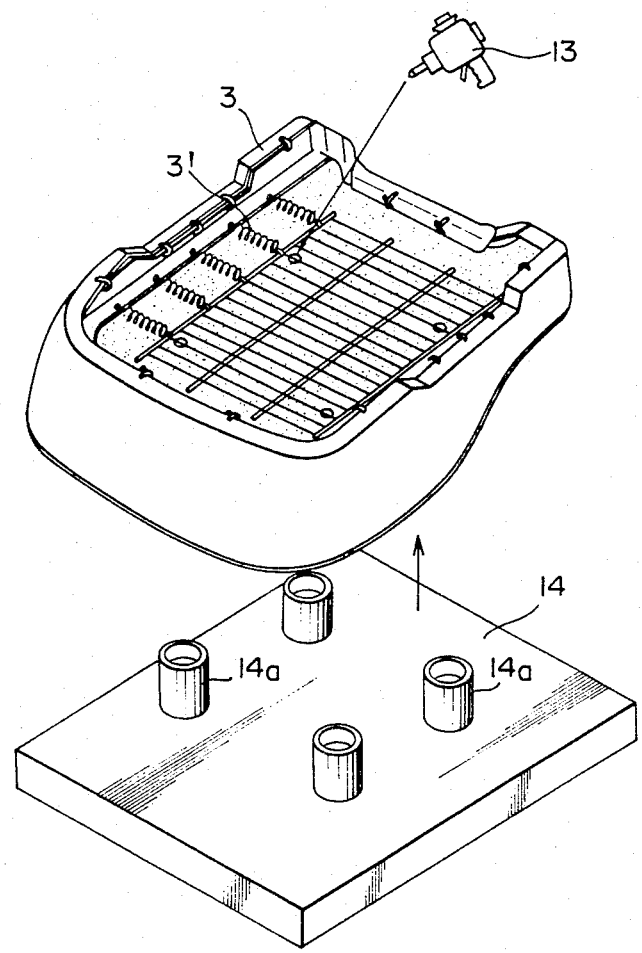
FIG. 31 is a view which illustrates the process for applying pressure to the buttons in the vehicle seat shown in FIG. 30.

In adhering top member a to pad member b, button 10 is pressed toward pad member b by pressing tool 14, as shown in FIG. 31. The area of adherence between buttons 10 and pad member b can be enlarged, and thus adherence improved, by controlling the pressure applied to buttons 10 by pressing tool 14, and in turn, controlling the amount of adhesive c which is dispensed. As shown in FIG. 30, top member a is pulled firmly by the adhesion of button 10 to pad member b, in a strength which is equal to that provided by any conventional pulling-in process.

The preferred adhesive is an adhesive which is instantly adhesible, e.g., hot melt adhesive.

Pressing tool 14 is provided with plurality of projections 14a such that a number of buttons 10 can be pressed in at the same time, as illustrated in FIG. 31.

Figure 32:
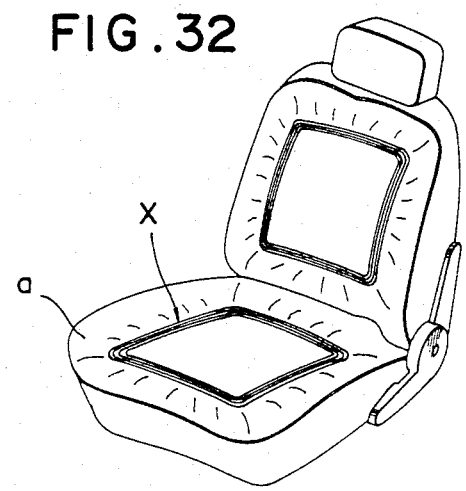
FIG. 32 is a perspective view of a vehicle seat having decorative recess grooves.
Figure 34:
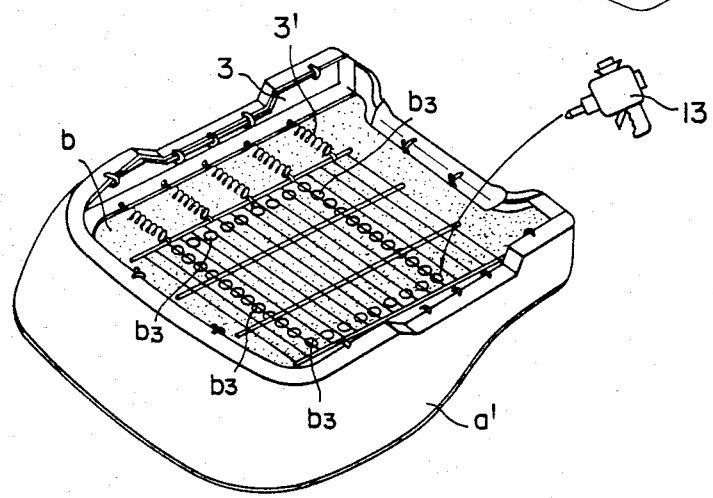
FIG. 34 illustrates a process for injecting adhesive material by means of an injector.
Figure 33:
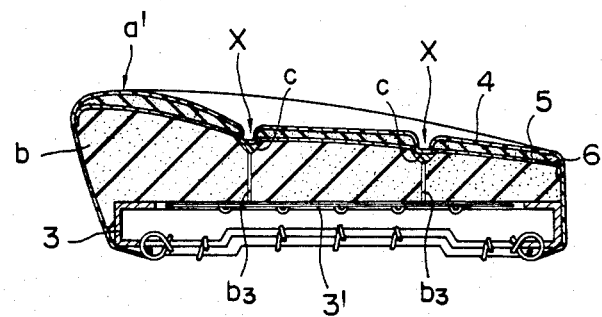
FIG. 33 is a sectional view of the vehicle seat shown in FIG. 32.

FIGS. 32-34 illustrate an embodiment similar to those shown in FIGS. 28-33, but where the upper surface of seat A is provided with recess groove X.

Although top member a' has three layers, it is also possible to utilize a top member a' having only a single layer in the embodiments shown in FIGS. 32-34. The center part of top member a in this embodiment is pulled in as a result of adhesion of top member a to pad member b. Therefore, because it is not necessary to use pulling-in members, the pulling-in work is carried out easily. Further, because the extent to which top member a is pulled in to pad member b can be easily controlled by controlling the pressure applied to top member a during adherence, a desired wadding shape can be put in relief on the seat surface.

According to the present invention, decorative buttons, grooves and creases can be formed in a vehicle seat surface merely by adhering a top layer member to the upper surface of a pad member. Therefore, the conventional steps of attaching pulling-in members to the top member, providing cut grooves for penetrating the pull-in members through the pad member and providing securing members for securing the pull-in members to the pad member are eliminated, thus resulting in simplified assembly, increased efficiency, and economy of steps. Because pulling-in work is eliminated, economy of steps results. Also, because the adhering area of the top member is located immediately below the recessed buttons, the load on the top member is not directly applied to the adhering area because the buttons are recessed such that they do not project above the top of the top member. Therefore, the top member cannot easily be peeled off.

From the foregoing description, one skilled in the art can easily ascertain the essential characteristics of the present invention, and, without departing from the spirit and scope thereof, can make various changes and modifications of the invention to adapt it to various usages and conditions.

What is claimed is:

1. A vehicle seat comprising: (a) a pad member having an upper surface and at least one depression along said upper surface;
   (b) adhesive material positioned on each said at least one depression;
   (c) a top member having a substantially flat underside, said top member being attached to said upper pad surface along said depressions by said adhesive material, said top member being pushed into each said at least one depression, wherein said adhesive material is applied only to said pad member depressions; and
   (d) at least one decorative crease formed in an upper surface of said top member at each portion of said top member which is pressed into each said at least one depression.

2. A vehicle seat in accordance with claim 1 wherein said top member comprises an upper surface, an intermediate layer of wadding and a lower wadding cover, said upper surface having at least one ornamental depression, said top layer, said intermediate layer of wadding, and said wadding cover being adhered to one another by high frequency welding.

3. The seat as recited in claim 1 wherein each said depression comprises a groove.

4. The seat as recited in claim 3 wherein said groove is substantially rectangular in shape.

5. The seat as recited in claim 1 wherein said adhesive material which is applied to said pad member depressions is adhesive hot melt material such that said top member and said pad member can be adhered together by the application of heat.

6. The seat as recited in claim 1 further comprising a frame for supporting said pad material.

7. The seat as recited in claim 2 further comprising a button adhered to each decorative crease formed in said top member.

8. The seat as recited in claim 7 wherein said button is integral with said top member.

9. The seat as recited in claim 7 wherein said button is separate from said top member.

10. The seat as recited in claim 3 further comprising a contrasting colored tape adhered to the groove formed in said top member.

11. The seat as recited in claim 1 wherein said top member comprises a single sheet of material.

12. The seat as recited in claim 1 wherein said top member comprises a plurality of rows of depressions adapted for adhering to a single depression in said pad member.

13. The seat as recited in claim 12 further comprising a contrasting colored tape disposed between the end rows of said plurality of rows of depressions.

14. The seat as recited in claim 1 wherein said pad member has first and second depressions and said top member includes a button disposed such that said button fits within said a second of said pad member depressions when said top member is adhered to said pad member.

15. The seat as recited in claim 14 further comprising a string attached to said button on one end and to a wire imbedded in said pad member on the other end such that said button is pulled into said second depression by said string.

16. The seat as recited in claim 14 wherein said button is adhered to the bottom of said second depression by an adhesive material.

17. The seat recited in claim 16 wherein said adhesive material is an adhesible hot-melt material.

18. The seat as recited in claim 1 wherein said depression on said pad member includes a projection such that when said top member is adhered to said pad member a button is formed.

19. The seat as recited in claim 1 wherein said pad member has access holes formed in each said pad member depression, said access holes extending through the bottom of said pad member such that adhesive material can be injected through said holes into each said pad member depression.

* * * * *

UNITED STATES PATENT AND TRADEMARK OFFICE
CERTIFICATE OF CORRECTION

PATENT NO. : 4,534,595

DATED : August 13, 1985

INVENTOR(S) : Tadafumi Abe et al.

It is certified that error appears in the above-identified patent and that said Letters Patent is hereby corrected as shown below:

Column 7, line 19, "prefered" should read -- preferred --.

Signed and Sealed this

Twenty-fourth Day of June 1986

[SEAL]

Attest:

DONALD J. QUIGG

*Attesting Officer*  *Commissioner of Patents and Trademarks*